US011985493B2

(12) United States Patent
Gerkinsmeyer

(10) Patent No.: US 11,985,493 B2
(45) Date of Patent: May 14, 2024

(54) INTEGRATED TRANSDUCER

(71) Applicant: Norman Gerkinsmeyer, Neu-Ulm (DE)

(72) Inventor: Norman Gerkinsmeyer, Neu-Ulm (DE)

( * ) Notice: Subject to any disclaimer, the term of this patent is extended or adjusted under 35 U.S.C. 154(b) by 164 days.

(21) Appl. No.: 17/889,268

(22) Filed: Aug. 16, 2022

(65) Prior Publication Data

US 2022/0394389 A1 Dec. 8, 2022

Related U.S. Application Data

(63) Continuation-in-part of application No. PCT/DE2021/000031, filed on Feb. 17, 2021.

(30) Foreign Application Priority Data

Feb. 18, 2020 (DE) ..................... 10 2020 001 041.5

(51) Int. Cl.

*H04R 9/02* (2006.01)
*H04R 1/02* (2006.01)
*H04R 9/04* (2006.01)
*H04R 9/06* (2006.01)

(52) U.S. Cl.

CPC ............. *H04R 9/027* (2013.01); *H04R 1/025* (2013.01); *H04R 9/043* (2013.01); *H04R 9/047* (2013.01); *H04R 9/06* (2013.01); *H04R 2209/027* (2013.01); *H04R 2209/041* (2013.01); *H04R 2400/11* (2013.01)

(58) Field of Classification Search

CPC .......... H04R 9/043; H04R 9/06; H04R 9/027; H04R 2209/027; H04R 2209/041; H04R 2400/11

See application file for complete search history.

(56) References Cited

U.S. PATENT DOCUMENTS

2016/0212513 A1* 7/2016 Honda ................. H04R 31/006
2017/0332173 A1 11/2017 Gerkinsmeyer ......... H04R 9/02

FOREIGN PATENT DOCUMENTS

EP 1158835 11/2001 ............. H04R 23/00
EP 3528510 8/2019 ............... H04R 7/04
WO WO2014090346 6/2014 ............... H04R 9/02
WO WO-2014090346 A1 * 6/2014 ............. H04R 9/025
WO WO2018167538 9/2018 ............... H04R 7/04

OTHER PUBLICATIONS

International Search Report and Written Opinion and International Preliminary Report on Patentability with translation dated Jul. 27, 2021, 40 pages).

* cited by examiner

*Primary Examiner* — Sunita Joshi
(74) *Attorney, Agent, or Firm* — HAYES SOLOWAY P.C.

(57) ABSTRACT

Disclosed is a sound transducer, which can be assembled, integrated or installed primarily in the consumer, pro audio, installation and automotive sectors on land, water and air with minimal space requirements, use of materials and weight. The transducer includes a ring sound wave shaper having a very flat, thin multi-layered, flexible membrane, which generates point-shaped or ring-shaped sound within the membrane diameter.

20 Claims, 4 Drawing Sheets

Cross Section A-A

Cross Section A-A

Cross Section A-A

Cross Section A-A

FIG 5 Rear View
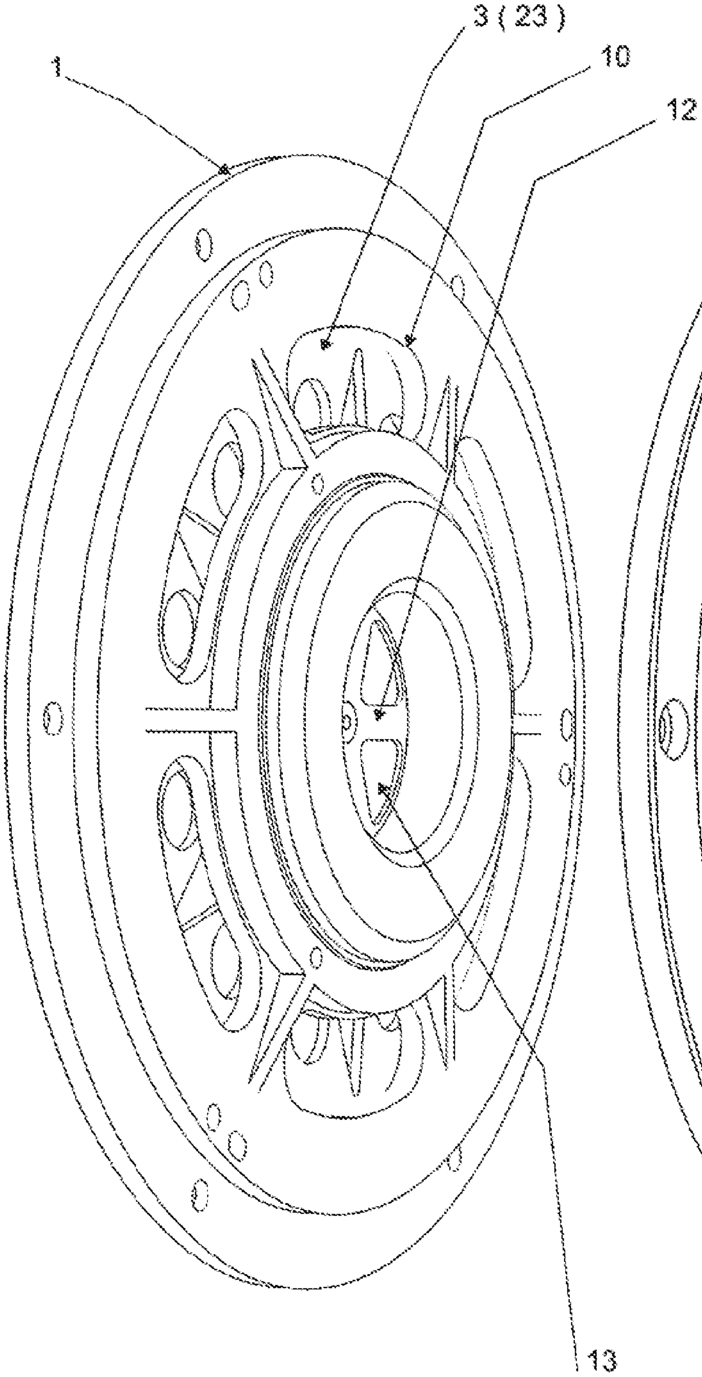
FIG 6 Front View
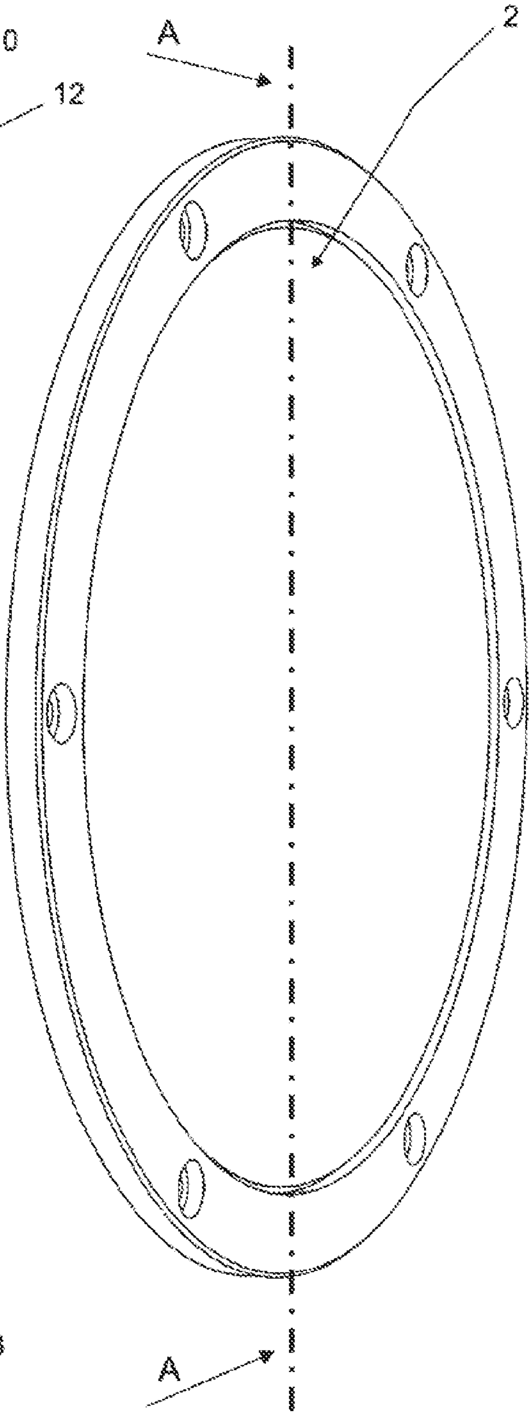

INTEGRATED TRANSDUCER

CROSS REFERENCE TO RELATED APPLICATIONS

This application is a continuation-in-part of PCT International Patent Application Serial No. PCT/DE2021/000031, filed Feb. 17, 2021, which in turn claims priority from German Patent Application Serial No. 10 2020 001 041.5, filed Feb. 18, 2020, the contents of which is incorporated herein.

DESCRIPTION OF INTEGRATED CONVERTER

The invention relates to a sound transducer, which can be mounted, integrated, or installed primarily in the consumer, pro-audio, installation and automotive sectors on land, water and air with minimal space requirements, use of materials and weight.

Especially in the automotive and aviation sector, the integration of the previous sound transducers in the remaining surfaces of the panels in the doors, sides, ceilings and IT panels (instrument panels), etc. is a very big problem because these are usually relatively deep and heavy and, above all, optically are always a challenge for the designers and therefore a hot topic.

One would like to condemn them completely, but that would be unacceptable for acoustic and audio quality reasons. Therefore, e.g. in the car sector, the tweeters are usually installed in the mirror triangles, A-pillars or lying in the corners of the IT panels and in the rear in the C/D-pillars or panels.

It is even more difficult with the deeper and larger-diameter midrange and bass speakers. You still have to provide sufficient installation space for all loudspeakers, the wiring, rear cover, protective grille, many amplifier channels and power, etc.

To make matters worse, there are more and more electronics, batteries, safety precautions, especially in the new hybrid and electric vehicles, in the doors or in the 1 panel, in the rear shelves or the A, B, C, etc. pillars, such as stiffeners or airbags, etc., and that is why less installation space, efficiency and weight savings play an increasingly important role, which the current sound transducers, however, largely fulfill.

The technology according to the invention "integrated converter" (hereinafter referred to as converter) shows the following several possibilities to meet the new circumstances and needs.

For the sake of simplicity, the following descriptions, exemplary embodiments and illustrations are designed and described as rotationally symmetrical shapes without wishing to refer or limit them alone; other shapes are also possible.

In contrast to conventional loudspeakers, the converter according to the invention is a ring sound wave shaper that has a very flat, thin, depending on the application, a mostly multi-layered, flexible membrane that generates point-shaped or ring-shaped sound within the membrane diameter or fastening diameter of the converter basket.

Not to be confused with the sound converters that are operated according to the converter principles of DML (Distributed Modes Loudspeaker) or BMR (Balanced Modes Radiators) known in professional circles. These types are briefly explained below: DMLs are usually implemented with so-called exiters. In principle, these are loudspeakers without membranes, but they have centering and, in some cases, beads.

And instead of the membrane, a solid plate, which is mostly made of metal, is attached.

Now a very large and stable free-vibrating membrane/supporting structure is mounted over this plate, which is then excited decentrally by the exiter and so a chaotic waveform is formed over the entire surface and the mounted structure and thus generates sound. However, in this case, the entire structure (e.g., cladding) vibrates and this is usually not accepted. In addition, the sound is not really accurately reproduced. Another disadvantage is the very high required net mass and depth of the mounted exiters for the principle to work.

In principle, BMRs are flat membrane loudspeakers with a conventional design, weight and depth, with a relatively hard and thick membrane with a bead, in which an attempt is made to generate higher frequencies by selectively adding mass to the middle of the membrane. These BMRs are therefore among the speakers that are more commonly known as piston vibrators but are not really convincing in terms of sound.

The fact that both (BMR and DML) types are not widely accepted in the market is also proven by the poor sales figures, small areas of application and quantities in almost all areas of industry, although they have been on the market for decades.

As already mentioned at the outset, the converter according to the invention functions in a significantly different way here, above all without the aforementioned problems and disadvantages.

And because the converter according to the invention has neither a bead nor a centering and also only a flat and very thin membrane, it is extremely flat.

Therefore, there are many integration options here. One of these would be to integrate part or all of the transducer cage into the component structure in which it is to be mounted.

In other words, the converter merges with the supporting structure of a cladding and the membrane is formed or covered with the top layer of the cladding (e.g. leather, plastic films, fleece, wallpaper, etc.).

In the event that the materials clad with the top layer would be too heavy (high moving mass) to generate high tones or in some cases the high tone reproduction should be increased further, there is another option according to the invention.

For this purpose, in the area inside the voice coil, e.g., on the underside of the membrane, a spiral-shaped conductor track is attached, which is also electrically contacted at the respective end in the same direction and in the direction of the magnet system on the center of the opposite elastic central guide damper there is a central magnet (e.g., with N-S polarity) and a surrounding magnet (with the opposite S-N polarity).

And so that membrane resonances and partial vibrations are also eliminated in this case and the sound wave form actually corresponds to that of ring sound waves, there is also a kind of elastic connection (=central damper) between the underside of the membrane, via the central magnet and the elastic central guide damper. In some cases, it has proven to be advantageous to use a further surrounded or ring-shaped elastic damper.

In any case, viewed physically, an isodynamic sound converter is formed in this area and the converter according to the invention thus becomes a hybrid sound converter. The sound wave propagation remains the same, namely that of the ring sound wave shaper according to the invention.

It has also proven to be advantageous to design the membrane like a sandwich in multiple parts/multilayers or also in one part/single layer. The membrane itself can be either thinner or thicker as seen from the center outwards, or it can also have ring-shaped compression or weakening or, for example, radiate characteristics. All of the aforementioned measures prevent disruptive propagation and reflections from opposing modes and surface resonances.

A special shape and design of the voice coil and the magnet has also proven to be advantageous for the high-frequency range. Windings that are exchanged in an air gap or are surrounded by magnetic material have a higher inductance, which significantly reduces the high-frequency reproduction (similar to a first-order low-pass filter). The state of the art is the use of a so-called copper cap in the air gap, which reduces the inductance of the winding and thus an impedance increase towards the highs.

However, this measure in itself is not sufficient and therefore a voice coil is also used in the converter according to the invention, which uses two electrically separate windings wound one behind the other in the same air gap, which are then electrically optionally connected in series, together in parallel via one or each via a separate amplifier channel be contacted. In the case of individual or parallel connection and supply, the inductance is then significantly lower than in the aforementioned or all other conventional constructions, and the high-frequency range is thus transmitted almost loss-free.

A further measure to reduce distortion, resonance, intermodulation and disturbances in playback are constructive measures. All parts such as the bars of the baskets and their openings, the number of beams in the elastic dampers, supply lines, contacts, etc. should be designed with the quantity of a lower prime number. As a result, not only the even-numbered and multiple distortion components etc. are fundamentally reduced.

In any case, the converter according to the invention is able to transmit almost the entire audio frequency range far beyond the 20 kHz range and in the highest quality, thus avoiding the need for additional external loudspeakers especially for the high-frequency range. An addition in the low-frequency range is conceivable and, depending on the application etc., makes sense but is not mandatory.

As a result, the converter according to the invention corresponds to the ideal of a point sound source with optimal impulse and time behavior with the result that, for example, the spatial reproduction is reproduced almost perfectly, this is also referred to as the virtual stage.

In the sum of its properties, the converter according to the invention saves installation effort, cables, various protective grilles, various tools and costs for the baskets and loudspeaker parts, several and deep installation spaces, expensive magnetic materials, fewer amplifier channels and therefore also less power consumption, considerable weight, etc. and you can see depending on the degree of integration, there is no longer a loudspeaker, a blessing for every interior designer.

Accordingly, the inventor proposes: An integrated converter, having at least:

a support structure called the converter basket, which is very flat, with webs or air passages, the number of which corresponds to a prime number if possible, a first magnet system, consisting of at least one magnetic yoke, a permanent magnet, a pole plate and a pole core (front side of the yoke) which can have a copper or pole cap, a first air gap of the magnet system (formed by pole plate and copper cap) into which at least one first voice coil is immersed, which has 2 separate windings on the voice coil former, which are wound one behind the other and which each have an electrical contact, each individually or in parallel together with an amplifier channel can be contacted and operated and whose voice coil support is connected to the underside of the first membrane, a first elastic central guide damper which is located in the center of the first magnet system in the direction of the membrane and which has air passages/openings the number of which corresponds as far as possible to a prime number, a first elastic central guide damper on which there is a first elastic central damper which is connected to the underside of the first membrane and the first central guide damper, depending on the structure and purpose of use, a second circumferential elastic damper is located on the first elastic central guide damper, which is connected to the underside of the first membrane and the first central guide damper, wherein the first membrane is designed to be flexible and can consist of several layers, the first membrane or supporting membrane is connected or attached to the first very flat supporting structure (transducer basket) via a flat, perforated elastic radial damper located up to the outer edge, the number of rays with perforations of which correspond to a prime number if possible.

In the case of the hybrid version there are:

further permanent magnets located on the first elastic central guide damper in the direction of the diaphragm or supporting diaphragm, a rotating magnet (e.g. with the N-S polarity) and a central magnet in the center (e.g. with the S-N polarity), in the area within the voice coil, e.g., the underside membrane or support membrane a spiral conductor track which is also contacted electrically in the same direction at the respective end of the winding. Depending on the application, the contact can be made together with the other contacts or separately, at least one elastic, flatter central damper, in this case located or provided between the central magnet and the membrane, others are conceivable, And in the case of the higher level of integration:

the supporting structure (transducer basket) is designed in such a way that it is set back to such an extent that it can be assembled with the supporting structure of the panels etc. (e.g. of a vehicle) so that the front side of the supporting membrane is directly or indirectly connected to the lower or The back of the cladding or the cover or the cover layers etc. is connected in such a way that it can produce sound over it.

the supporting structure (converter basket) and the supporting structure of the panels etc. (e.g. of a vehicle) merges and is a part and that the front of the support membrane is directly or indirectly connected to the underside or rear of the panel/cover/cover layers etc. so is linked to the fact that it can produce sound via it.

Depending on the situation or position, it has proven to be advantageous to provide, for example, a grid on the front, paneling side, side of the cover or the top layer to protect against contact.

And if the membrane of the transducer according to the invention with its front side is not directly or indirectly attached to the underside or back of the cladding or the cover or the cover layers etc., the cladding or the cover or the cover layers should be perforated or sound-permeable and be designed to be stable so that protection against accidental contact, e.g., grid is superfluous.

The invention is described in more detail below with reference to the figures, with only the features necessary for understanding the invention being shown. And, for a better overview, only those parts or sections are hatched in the respective figures that actually differ from the other figures and their parts or sections or are supplemented.

BRIEF DESCRIPTION OF THE DRAWINGS

They show in detail:

FIG. 5: Integrated converter according to the invention in a vertical 3D representation the back;

FIG. 6: Integrated converter according to the invention in a vertical 3D representation the front;

For the sake of simplicity, almost all of the parts shown or described here or below are designed to be rotationally symmetrical, symmetrical or ring-shaped. However, deviating shapes, designs and materials are not excluded.

DETAILED DESCRIPTION OF THE INVENTION

Figure 1:
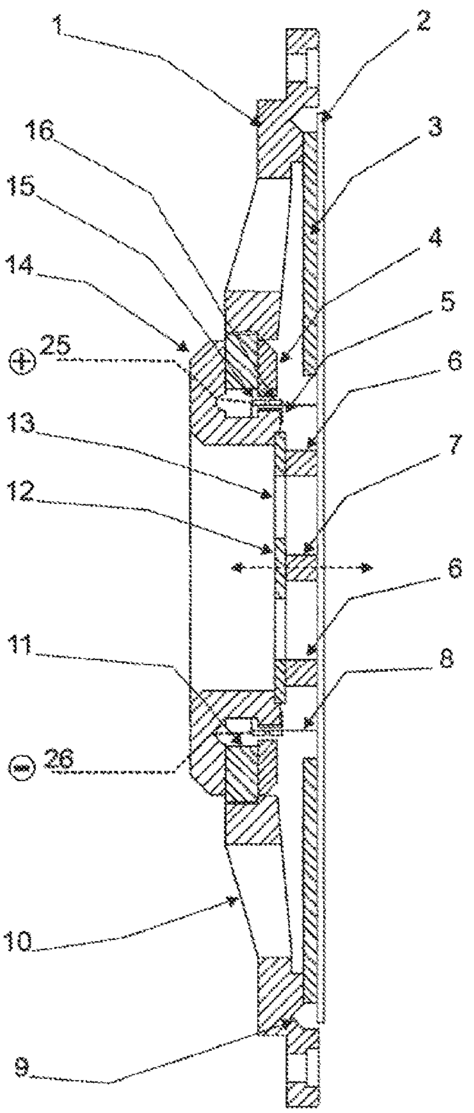
FIG. 1: Integrated converter according to the invention in the vertical sectional view.

FIG. 1 shows the basis of the integrated converter according to the invention is the flat support structure (converter basket) 1, with webs and air passages 10, the number of which should correspond to a prime number, mounted in this is the magnet system, consisting of at least one magnetic yoke 14, a permanent magnet 11, a pole plate 4 and a pole core formed by the yoke 14 of the circumferential copper or pole cap 5.

In the air gap (formed by the pole plate 4 and copper cap 5) of the magnet system (in the direction of the membrane 2), the voice coil immerses (consisting of the coil carrier 8 and the 2 separate windings 14, 16 with their electrical contacts 25 and 26) which is attached on the underside of the support membrane 24 in the center of the magnet system there is an elastic central guide damper 12 with its webs of air passages 13, the number of which should correspond to a prime number and which is connected in its center to the underside of the membrane 2 via an elastic central damper. Depending on the structure and intended use, it can be advantageous to provide a second circumferential elastic damper 6, which is also connected to the underside of the first membrane and the elastic central guide damper 12.

While the first membrane 2 is fastened to the flat supporting structure (transducer basket) 1 via an external narrow web via a flat, perforated, radial damper 3, which is located up to the outer edge and has a number of perforated rays that correspond to a prime number if possible.

And, so that the membrane 2 has a certain flexibility and resonances and modes cannot continue to run outwards and then reflect, there is a circumferential groove 9 outside. The double arrow shows the direction of movement Furthermore, it has proven to be advantageous to construct the thin flexible membrane 2, the dampers 6, central dampers 7, central guide dampers 12 and dampers 3 in multiple layers. Foils, nonwovens, fabrics, foams, sandwiches, etc. are particularly suitable for this purpose, which can consist of plastics, metals or natural materials or mixed forms and, depending on the part and purpose, can be adhesive on one or two sides.

Figure 2:
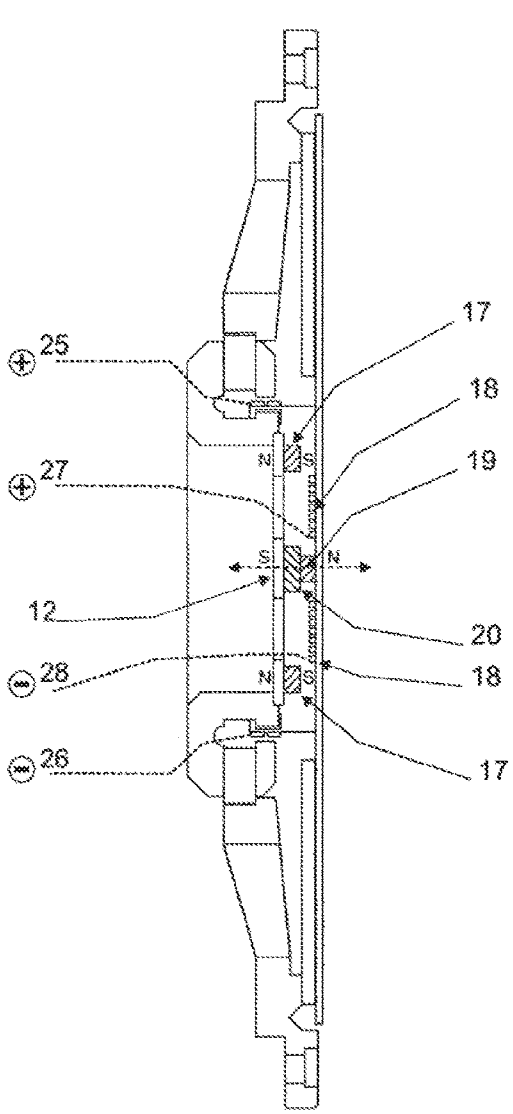
FIG. 2: According to the invention integrated converter in the vertical sectional view as a hybrid version.

In the hybrid version, FIG. 2 shows that the central guide damper 12 has further permanent magnets in the direction of the membrane 2, namely a rotating magnet 17 (e.g., with the N-S polarity) and a central magnet 20 in the center (e.g., with the S-N polarity), and in the area inside the coil carrier 8, e.g., on the underside of the membrane 2, there is a spiral conductor track 18 which is electrically connected in the same direction at the respective end of the winding and is also contacted 27 and 28. Depending on the application, the contact can be made together with the other contacts 26 and 26 but also separately; the double arrow shows the direction of movement.

Furthermore, at least one elastic, flatter central damper 19, located or provided in this case between the central magnet and the membrane 2, or another circumferential elastic damper is possible.

Figure 3:
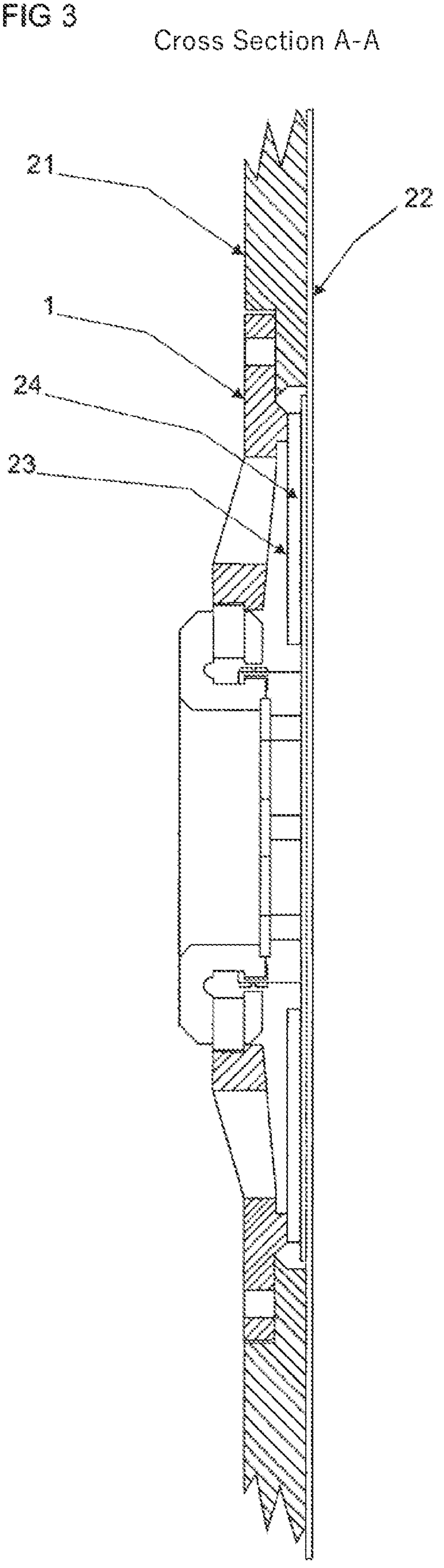
FIG. 3: According to the invention integrated converter in the vertical sectional view in a simple integrated version.

A simple integrated version is shown in FIG. 3. Here, the supporting structure (transducer basket) 1 is designed in such a way that it is set back to such an extent that it can be mounted with the supporting structure of the panels etc. (e.g., of a vehicle) 21 so that the front side of the supporting membrane 24 is connected directly or indirectly to the bottom or back of the panel or the cover or the cover layers 22 etc. in such a way that it can produce sound over it.

Figure 4:
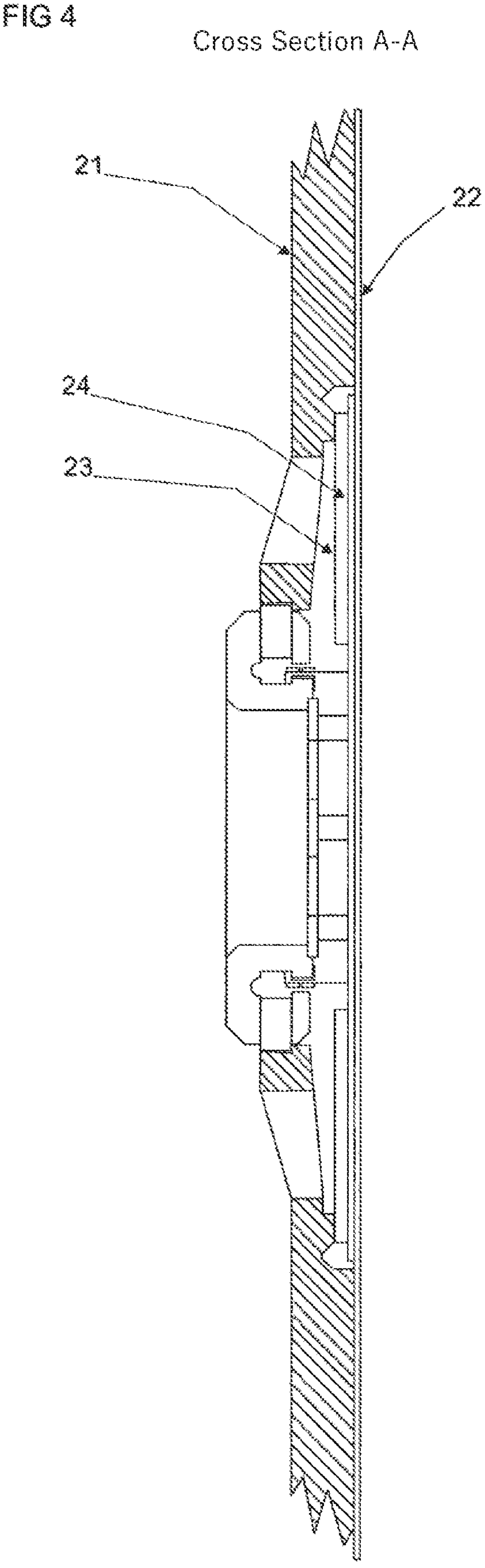
FIG. 4: According to the invention integrated converter in the vertical sectional view in the highly integrated version.
Figure 7:
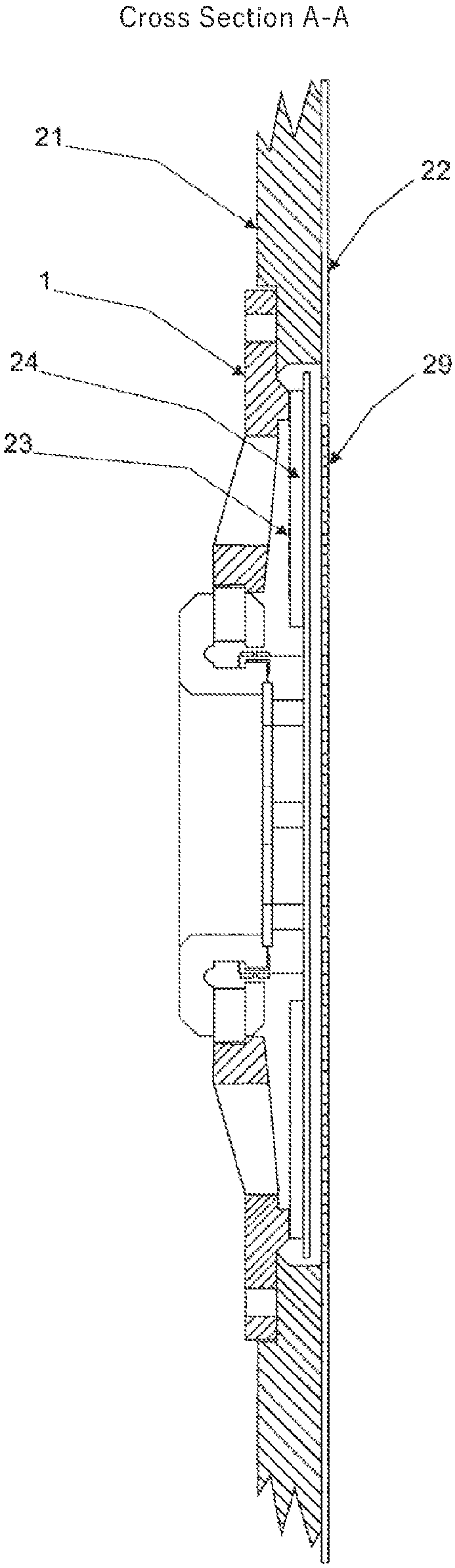
FIG. 7: According to the invention integrated converter in the vertical sectional view in another simpler integrated version.

A highly integrated version is shown in FIG. 4. Here, the support structure (converter basket) 1 transitions into the support structure of the panels 21 etc. (e.g., of a vehicle) or is reduced to one part and the front side of the support membrane 24 is connected directly or indirectly to the underside or rear side of the panel or is connected to the cover or cover layers 22 etc. in such a way that it can produce sound over it.

For a better understanding, FIG. 5 shows the 3D rear view of the integrated converter according to the invention.

Here you can see the support structure (converter cage) 1 with the air passages with bars 10, the radiating damper 3/23, the number of rays with holes of which should correspond to a prime number if possible, and the central guide damper 12 with its bars 12 and air passages 13, the number of which should be a prime number if possible should correspond.

For a better understanding, FIG. 6 shows the 3D front view of the integrated converter according to the invention with its membrane 2 and the section line indication A-A.

A version of a variant of the mounted integrated converter according to the invention in a cladding support structure (e.g., in the vehicle) 21 is shown in FIG In this case, the membrane 2 of the transducer according to the invention is not directly or indirectly attached with its front side to the underside or back of the lining or cover or cover layers 29 etc., the lining or cover or cover layers 29 should be perforated or sound-permeable and stable, so that protection against accidental contact, e.g., grid 30, is superfluous.

Figure 8:
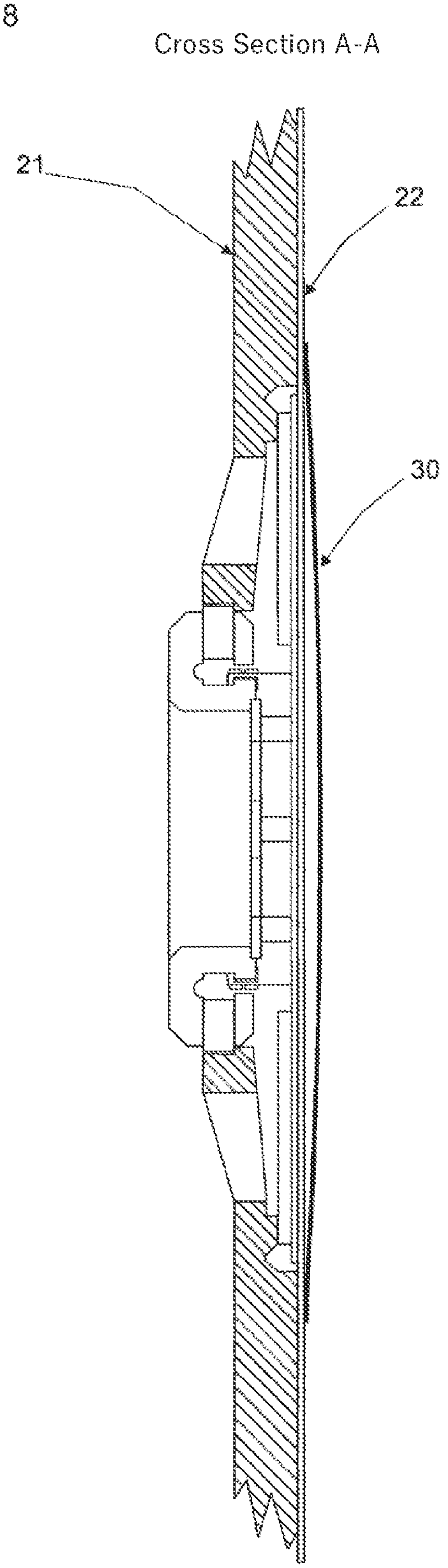
FIG. 8: According to the invention integrated converter in the vertical sectional view in the highly integrated version with touch protection grid.

The highly integrated version according to FIG. 4 is shown in FIG. 8. In addition, a protection against accidental contact or grid 30 is shown or proposed here.

In summary, the invention therefore discloses an integrated converter in hybrid design with:

a transducer basket with bars and air passages, the number of which should correspond to a prime number if possible, a first flexible multi-layer support membrane, which can have a different thickness profile and punctiform ring-shaped embossings between its center and outer edge and in the center of which there is a spiral conductor track on the underside back, at the respective ends of which the electrical contact +/− is located, a first magnet system (consisting of yoke, magnet, pole plate), a first ring-shaped copper cap on the pole core in the center of the first magnet, which together with the pole plate forms the air gap of the first magnet, a first voice coil, consist of a coil carrier with two electrically separated coils wound one behind the other, each of which is contacted via its own electrical contact +/− and the two coils dip into the air gap while the other side of the coil carrier connects the voice coil to the underside of the first membrane connects, a first central guide damper with webs and air passages, the number of which should correspond to a prime number if possible, a second central magnet located in the center of the first central guide damper, a third revolving magnet (with opposite polarity to the second central magnet) which is located on the central guide damper, a first elastic perforated radial damper whose number of rays with holes correspond to a prime number, via which the first multi-layer membrane flexibly connects to the transducer basket via an external narrow web, a first elastic central damper, which is located in the center on the second central magnet and thus elastically connects the underside of the first support membrane with the first central guide damper, a second elastic rotating damper, which is located on the third rotating magnet and thus elastically connects the underside of the first support membrane to the first central guide damper, a first supporting structure with a correspondingly thin, flexible covering in which the transducer basket is mounted or integrated with all the parts described above in such a way that the front or surface of the membrane can be connected to the back of the covering layer in such a way that sound is then generated via the covering can be.

The claims for protection now filed with the application and later are attempts to formulate without prejudicing the achievement of further protection. The references listed in the dependent claims indicate the further development of the subject matter of the main claim through the features of the respective sub-claim.

However, these are not to be understood as a waiver of achieving independent, objective protection for the features of the dependent claims. Features that were previously only disclosed in the description can be claimed in the course of the procedure as being of essential importance to the invention, for example to distinguish it from the prior art.

REFERENCE LIST

1 converter basket
2 membranes
3 radial damper
4 pole plate
5 copper cap
6 wraparound damper
7 central dampers
8 coil carriers
9 circumferential groove
10 air passage
11 magnetic
12 central guide dampers
13 air passages of the central guide damper
14 magnetic inference
15 1st Spool
16 2nd coil
17 rotating magnet
18 spiral trace
19 flatter central damper
20 central magnet
21 support structure
22 cladding top layer
23 dampers
24 support membrane
25 + electrical contacting
26 − electrical contacting
27 + electrical contact spiral conductor track
28 − electrical contact spiral conductor track
29 perforated panel top layer
30 protective grids etc.

The invention claimed is:

1. An integrated converter, comprising of:

a transducer basket with bars and air passages the number of which should correspond to a prime number and a bar and circumferential groove;

a first flexible multi-layer support membrane which can have different thicknesses and punctiform annular embossings between its center and outer edge and in the center of which there is a spiral conductor rack on the underside or rear, at the respective ends of which the electrical contact is located;

a first magnet system consisting of yoke, magnet, pole plate;

a first annular copper cap on the pole core center of the first magnet, which together with the pole plate forms the air gap of the first magnet;

a first voice coil, consist of a coil carrier with two electrically separate coils wound in series, each of which has its own electrical contacts and the two coils are in immerse the air gap while the other side of the coil former connects the voice coil to the underside of the first support diaphragm;

a first central guide damper with webs and air passages, the number of which should correspond to a prime number if possible;

a second central magnet which is located in the center of the first central guide damper;

a third revolving magnet (with opposite polarity to the second central magnet) which is located on the central guide damper;

a first elastic, perforated radial damper, the number of rays with holes corresponding to a prime number as far as possible, via which the first multi-layer support membrane is flexibly connected to the transducer basket via an external narrow web with a groove, a first elastic central damper which is located in the center on the second central magnet and thus elastically connects the underside of the first support membrane to the first central guide damper;

a second elastic encircling damper, which is located on the third encircling magnet and thus elastically connects the underside of the first support membrane to the first central guide damper;

a first support structure with a correspondingly thin, flexible cover layer in which the converter cage is mounted or integrated with all the previously described parts in such a way that the front side or surface of the support membrane can be connected to the back side of the cover in such a way that this can then be done sound can be generated via the cladding.

2. The integrated converter according to claim 1, wherein the electrical contact of the two coils on coil carrier and the contact of the spiral conductor track can also be done together.

3. The integrated transducer according to claim 1, wherein the supporting membrane is also made uniformly and in one layer.

4. The integrated transducer according to claim 1, wherein a further integrated version the first transducer basket is replaced or integrated into the supporting structure with the correspondingly thin flexible covering, so that all parts previously described are mounted or integrated is that the front or surface of the support membrane can be connected to the back of the cover layer so that the sound can then be made via the cover, and optionally including a protective grill.

5. The integrated transducer according to claim 1, wherein the transducer according to the invention does not have a supporting membrane but generates the sound itself via the membrane, it has proven to be advantageous in front of the transducer, at a distance from the membrane to use a cover layer that is perforated without loss of sound transmission and is designed to be stable against touch and indentation.

6. The integrated transducer according to claim 1, wherein the transducer is positioned horizontally, vertically, or overhead.

7. The integrated transducer according to claim 1, wherein the transducer is integrated as an individual sound transducer or in combination with other loudspeakers or basses in the housing or other objects.

8. The integrated transducer according to claim 7, wherein the transducer is designed as a so-called single-ended transducer or has a third revolving magnet, a spiral conductor track, a flatter central damper, a second central magnet, a central damper and, a circumferential damper, connecting the underside of the membrane with the upper side of the elastic central guide damper.

9. The integrated transducer according to claim 1, wherein the flexible membrane, support membrane, circumferential damper, central damper, central guide damper and damper are formed as single or multi-layered films, non-woven fabrics, fibers, fabrics, foams, and sandwiches of plastics, metals or natural materials or mixtures thereof, and which, depending on the part and purpose, have an adhesive on one or two sides.

10. The integrated converter according to claim 1, wherein the transducer basket is formed of plastics, metals, natural materials or mixtures thereof.

11. The integrated transducer according to claim 1, wherein depending on the intended use or conditions, not only the membrane can have a rotationally symmetrical but also a different shape.

12. The integrated converter according to claim 1, wherein the number of webs, air passages, openings do not correspond to prime numbers.

13. The integrated transducer according to claim 2, wherein the supporting membrane is also made uniformly and in one layer.

14. The integrated transducer according to claim 2, wherein a further integrated version the first transducer basket is replaced or integrated into the supporting structure with the correspondingly thin flexible covering, so that all parts previously described are mounted or integrated is that the front or surface of the support membrane can be connected to the back of the cover layer so that the sound can then be made via the cover, and optionally including a protective grid.

15. The integrated transducer according to claim 2, wherein the transducer according to the invention does not have a supporting membrane but generates the sound itself via the membrane, it has proven to be advantageous in front of the transducer, at a distance from the membrane to use a cover layer that is perforated without loss of sound transmission and is designed to be stable against touch and indentation.

16. The integrated transducer according to claim 2, wherein the transducer is positioned horizontally, vertically or overhead.

17. The integrated transducer according to claim 2, wherein the transducer is integrated as an individual sound transducer or in combination with other loudspeakers or basses in the housing or other objects.

18. The integrated transducer according to claim 17, wherein the transducer is designed as a so-called single-ended transducer or has a third revolving magnet, a spiral conductor track, a flatter central damper, a second central magnet, a central damper and a circumferential damper, connecting the underside of the membrane with the upper side of the elastic central guide damper.

19. The integrated transducer according to claim 2, wherein the flexible membrane, support membrane, circumferential damper, central damper, central guide damper and damper are formed as single or multi-layered films, non-woven fabrics, fibers, fabrics, foams, and sandwiches of plastics, metals or natural materials or mixtures thereof, and which, depending on the part and purpose, have an adhesive on one or two sides.

20. The integrated converter according to claim 2, wherein the transducer basket is formed of plastics, metals, natural materials or mixtures thereof.

* * * * *